US012167508B2

(12) United States Patent
Luckhardt

(10) Patent No.: US 12,167,508 B2
(45) Date of Patent: Dec. 10, 2024

(54) METHOD FOR CONTROLLING AN ELECTRIC APPLIANCE AND POWER CONTROL SYSTEM FOR CONTROLLING THE SUPPLY OF AN ELECTRIC APPLIANCE

(71) Applicant: ELECTROLUX APPLIANCES AKTIEBOLAG, Stockholm (SE)

(72) Inventor: Christoph Luckhardt, Rothenburg ob der Tauber (DE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 1169 days.

(21) Appl. No.: 16/964,280

(22) PCT Filed: Jan. 16, 2019

(86) PCT No.: PCT/EP2019/051074
§ 371 (c)(1),
(2) Date: Jul. 23, 2020

(87) PCT Pub. No.: WO2019/145206
PCT Pub. Date: Aug. 1, 2019

(65) Prior Publication Data
US 2021/0037611 A1 Feb. 4, 2021

(30) Foreign Application Priority Data
Jan. 24, 2018 (EP) .................................... 18153120

(51) Int. Cl.
*H05B 1/02* (2006.01)
*F24C 7/08* (2006.01)

(52) U.S. Cl.
CPC ............ *H05B 1/0258* (2013.01); *F24C 7/087* (2013.01)

(58) Field of Classification Search
CPC ............................. H05B 1/0258; F24C 7/087
See application file for complete search history.

(56) References Cited

U.S. PATENT DOCUMENTS 4,788,398 A 11/1988 Hornung
6,806,446 B1 * 10/2004 Neale ...................... F24H 15/37
392/485

(Continued)

FOREIGN PATENT DOCUMENTS

EP 2604930 6/2013
GB 2559389 A * 8/2018 ........... G01R 21/133

OTHER PUBLICATIONS

International Search Report and Written Opinion for PCT/EP2019/051074, dated Feb. 14, 2019, 7 pages.

(Continued)

*Primary Examiner* — Thien S Tran
(74) *Attorney, Agent, or Firm* — Pearne & Gordon LLP

(57) ABSTRACT

The invention refers to a method for controlling an electric appliance, in particular an electric household appliance (1, 11, 12). The electric appliance is coupled to an electric supply system, particularly to a line section (13) of an electric supply system. The electric supply system has a, preferably fuse-protected, limited electrical power transfer capacity. The electric appliance is operated by an operating program, which comprises at least one program segment during which relevant electrical power consumption is drawn from the electric supply system, particularly from the line section (13) of the electric supply system. The operating program is controlled based on at least one of:—the electrical power currently providable by the electric supply system;—the electrical power allocatable to the electric appliance by the electric supply system at present or on short notice;—the voltage value or amperage value currently existent in the electric supply system during the operation of the electric appliance;—a voltage drop or voltage difference or an amperage change currently occurring in the electric supply system at the moment of starting an operating program with relevant electrical power consumption;—a (Continued)

result of a comparison of a measured energy consumption information with a reference energy consumption information.

20 Claims, 3 Drawing Sheets

(56) References Cited

U.S. PATENT DOCUMENTS 6,906,617 B1 * 6/2005 Van der Meulen .......................... H04L 12/2823 340/3.7
8,618,452 B2 * 12/2013 Besore ...................... H02J 3/14 219/490
9,564,755 B2 * 2/2017 Lee ......................... H02J 3/008
2005/0171645 A1 * 8/2005 Oswald .................. G05B 15/02 700/29
2005/0173401 A1 * 8/2005 Bakanowski ........... F24C 7/087 219/412
2006/0231551 A1 * 10/2006 Ruther ...................... F24C 7/08 219/707
2008/0122585 A1 * 5/2008 Castaldo ................. H04L 67/12 714/E11.202
2010/0070091 A1 * 3/2010 Watson ............. H02J 13/00004 700/278
2010/0089909 A1 * 4/2010 Besore .............. H02J 13/00004 219/720
2011/0114627 A1 * 5/2011 Burt ........................ F24C 7/087 219/506
2011/0153101 A1 * 6/2011 Thomas .................... H02J 3/14 700/291
2011/0181114 A1 * 7/2011 Hodges ................... H02J 9/005 307/39
2012/0215370 A1 * 8/2012 Seo ..................... H04L 12/2803 700/296
2013/0171305 A1 * 7/2013 Cescot ................. H05B 1/0263 99/325
2013/0178994 A1 * 7/2013 Valluri ................... G01D 4/002 700/292
2014/0248802 A1 * 9/2014 Hieda ................. H04L 12/2825 439/620.01
2014/0316958 A1 * 10/2014 Alberth, Jr. ............ G06Q 10/00 705/35
2015/0362985 A1 * 12/2015 Thompson ............ G06F 1/3215 713/340
2015/0366220 A1 * 12/2015 Zhang ..................... A23P 30/20 425/382.3
2015/0372539 A1 * 12/2015 Livadaras ......... H02J 13/00001 700/297
2016/0051078 A1 * 2/2016 Jenkins ..................... F24C 7/08 99/341
2018/0226755 A1 * 8/2018 Davies .............. H02J 13/00002
2018/0321652 A1 * 11/2018 Jablokov .............. G05B 19/042

OTHER PUBLICATIONS

Australian Exam Report for Australian application No. 2019212085, dated Nov. 20, 2023, 4 pages.
European Communication for European application No. 19700716.4 dated Jan. 30, 2024, 7 pages.

* cited by examiner

METHOD FOR CONTROLLING AN ELECTRIC APPLIANCE AND POWER CONTROL SYSTEM FOR CONTROLLING THE SUPPLY OF AN ELECTRIC APPLIANCE

Generally, the present invention relates to a method for controlling an electric appliance, in particular an electric household appliance, and to a power control system for controlling the supply of an electric appliance, in particular of an electric household appliance, with electrical power. The present invention relates further, generally or specifically, to a method for operating a household appliance, particularly for operating a food preparation entity, and to a household appliance, in particular to a food preparation entity.

BACKGROUND OF THE INVENTION

In order to operate electric appliances, particularly electric household appliances, they are coupled to electric supply systems. Specifically said electric household appliances, particularly major household appliances, are equipped with components which are operated with relevant electrical power from the electric supply system, e. g. heating elements for heating fluids or other media for treating items drawing electrical power at least temporarily during an operating program. If more than only one of such major household appliances are coupled to the domestic electric supply system, particularly coupled to the same line section of the electric supply system, such electric supply system may be overloaded during time periods of simultaneous operation of said components requesting relevant power. In order to avoid damages in the domestic electric installations, said electric supply systems, particularly the individual line sections of the electric supply system, is limited in its supply capacity, e. g. by fuse-protection.

Moreover, food preparation entities for preparing food are particular major household appliances. In known food preparation entities, the cooking or baking process is controlled based on user input. For example, a user can set temperature and cooking/baking time using a user interface of the food preparation entity. Disadvantageously, the user-friendliness of known food preparation entities is low because a user has to estimate parameters of the cooking process on his own and has to provide said parameters via said user interface to the food preparation entity which is perceived as being complicated.

SUMMARY OF THE INVENTION

It is an objective of the embodiments of the present invention to provide a method for controlling an electric appliance, in particular an electric household appliance, preventing an overload of a limited electric supply system, adapting automatic operating programs to instant conditions in the electric supply system, thereby further improving results of automatic operation programs.

It is a further objective of the present invention to provide a method for operating a food preparation entity which enhances the user-friendliness of said food preparation entity.

If not explicitly indicated otherwise, embodiments of the invention and single features of said embodiments can be freely combined with each other.

According to a first aspect, a method for controlling an electric appliance, in particular an electric household appliance, which electric appliance is coupled to an electric supply system, particularly to a line section of an electric supply system, is provided. The electric supply system, particularly the line section of the electric supply system, has a, preferably fuse-protected, limited electrical power transfer capacity. The electric appliance is operated by an operating program, which comprises at least one program segment during which relevant electrical power consumption is drawn from the electric supply system, particularly from the line section of the electric supply system. The operating program, in particular the at least one program segment with relevant electrical power consumption, is controlled based on at least one of:

- the electrical power currently providable by the electric supply system, particularly by the line section of the electric supply system;
- the electrical power allocatable to the electric appliance by the electric supply system, particularly by the line section of the electric supply system, at present or on short notice;
- the voltage value or amperage value currently existent in the electric supply system, particularly in the line section of the electric supply system, during the operation of the electric appliance, in particular during the at least one program segment with relevant electrical power consumption;
- a voltage drop or voltage difference or an amperage change currently occurring in the electric supply system, particularly in the line section of the electric supply system, at the moment of starting an operating program, particularly a program segment, with relevant electrical power consumption;
- a result of a comparison of a measured energy consumption information with a reference energy consumption information.

Preferably at least one physical, particularly at least one electrical, property or value is measured by means of at least one measuring device. Said physical, or specifically electrical, property or value may be one of the above-mentioned electrical power, voltage, amperage, all of them by measuring either their absolute value(s) or any changes thereof at the moment of load changes, particularly when switching from a program step or segment with low electrical power consumption to a program step or segment with relevant or high electrical power consumption, or vice versa.

The at least one program segment with relevant electrical power consumption may comprise a program step with operation of a heating element. In case of the electric appliance being an electric household appliance, the program step with operation of a heating element may be a heating-up or keeping on a particular increased and constant temperature level of a medium in a container or a compartment, thereby providing treatment conditions for items to be treated, e. g. for cooking or baking food in an oven compartment.

The controlling of the operating program with afore-described method may compensate for reduced power transfer, particularly heating power transfer, during phases with available voltage in the electric supply system, in particular in the line section of the electric supply system, which is lower than the nominal voltage. Usually, program steps in operating programs calculate with the availability of generally the nominal voltage. Such nominal voltages vary from a global perspective, in specific countries even different nominal voltages may be found in different regions. Moreover, the real voltages in the local power grids can deviate from the nominal voltage by a defined margin, e. g. IEC 60038 standard allows +/−10% deviation margin. Consequently, the actual voltage in European countries may be in the range between 207 V to 253 V. Depending on the actual available voltage, for instance the heating energy that can be produced from a resistance heater may vary respectively. As an example, in the case of a domestic cooking oven, if a heating element is operated during an automatic baking process using hot air mode with 220 V instead of the standard 230 V, said heating element puts out about 8% less heating energy and a circulation fan, operated during said hot air mode, turns about 7% slower than with operation at nominal voltage. In this example, the food inside the oven needs more time to heat up and to be prepared.

The term "relevant electrical power consumption" may be understood as an electrical power draw in the line section of about at least 10%, preferably at least 20%, more preferably at least 25% of the maximum value of providable electrical power in the line section.

A specific embodiment is characterized by an electric supply system which communicates the value of fuse protection of the line section and/or the maximum providable and/or currently still providable amperage value and/or the maximum providable and/or currently still providable electrical power to the electric appliance or to a network the electric appliance is connected to.

At least a first electric appliance and a second electric appliance, particularly a first and a second electric household appliance, may be connected to a common network and at least one of the first and the second electric appliances provides information to the common network, in particular to the other one of the first and the second electric appliances.

Preferably, at least one of the first and the second electric appliances communicates at least one of:

- a status information, which may be an ON/OFF state and/or a stand-by mode;
- the currently activated or running program sequence of the running operating program, particularly the operation of a consumer load with high power consumption value;
- connection of the electric appliance to a specific line section of the electric supply system;
- each individual maximum power consumption value required by the available operating programs, preferably together with an expected time of occurrence.

According to embodiments, a control device or system of or for the first electric appliance and/or of or for the second electric appliance and/or of or for the common network combines the information provided by the first and the second electrical appliances and particularly of the electric supply system and/or of the at least one measuring device. In particular, a status information of the first and second electrical appliances and/or voltage value or voltage drop information in at least the line section of the electric supply system may be combined for the control of at least one of the first or second electric appliances.

The operating program, particularly the at least one program segment with relevant electrical power consumption, of the electric appliance, in particular of at least one of the first and the second electric appliances, may be modified based on the result of voltage and/or amperage and/or power measurement. Particularly, the modification of the operating program comprises at least one of:

- pausing or postponing a non-time-critical process or program step;
- making boost functions available, in particular during periods of a current low power required from the electric supply system, particularly from the line section of the electric supply system;
- switching to a low power operating program cycle;
- reducing energy transfer rate, in particular during a heating cycle, to be compensated by an increased program duration.

A specific embodiment provides an operating program, which may be the at least one program segment with relevant electrical power consumption, which operating program is modified based on a voltage difference between the measured actual available voltage value and a reference voltage value of the electric supply system, particularly of the line section of the electric supply system. This modification may advantageously compensate for a reduced power transfer, particularly a heating power transfer, occurring when a resistance heater is operated with a voltage lower than the nominal voltage of the electric supply system at the installation location of the electric appliance.

According to embodiments, the electric appliance, in particular at least one of the first and the second electric appliances, is controllable based on the result of voltage and/or amperage and/or power measurement by means of at least one of:

- limiting the maximum power allocated to the electric appliance, particularly when starting an operating program;
- postponing the start of a requested operating program, particularly until no other appliances or only appliances with operating programs with low power consumption is or are running;
- offering only operating programs for a selection by the user of the electric appliance, which operating programs match the available electrical power;
- restricting the options of the user to power-limited program cycles, particularly not offering operating program options with a boost function.

A priority level may be allocated to at least one of the first and the second electric appliances and/or to at least one of specific operating programs of the first and the second electric appliances and/or to at least one of specific program steps of the operating programs of the first and the second electric appliances. Considering said priority level, currently available electrical power is assigned primarily to a higher prioritized electric appliance and/or operating program and/or program step.

According to another aspect, the invention relates to a method for operating a household appliance, which may be a specific embodiment of the afore-described method for controlling an electric appliance, particularly for operating a food preparation entity. The household appliance is adapted to treat items, particularly to bake and/or cook food. The method comprises the steps of:

- providing reference energy consumption information, said reference energy consumption information indicating the energy consumption of the household appliance which is operated without items to be treated, particularly the energy consumption of the non-food-loaded food preparation entity, during a heat-up phase;
- measuring the energy consumption of the household appliance which is operated with items to be treated, particularly the energy consumption of the food-loaded food preparation entity, during a heat-up phase;
- comparing the reference energy consumption information and the measured energy consumption, thereby obtaining a comparison result;
- controlling the household appliance, particularly the food preparation entity, based on said comparison result.

Said control method is advantageous because by comparing the energy consumption of the household appliance operated with items to be treated, specifically the energy consumption of the food-loaded food preparation entity (i.e. said entity comprises food to be cooked or baked) with the energy consumption of the non-loaded household appliance, particularly with the energy consumption of the non-food-loaded food preparation entity (i.e. said entity does not comprise food to be cooked or baked), a difference of energy consumption can be determined which is indicative for certain control parameters, specifically the needed operating time, specifically the cooking/baking time. Thereby, the user-friendliness of said household appliance can be significantly increased.

According to embodiments, said reference energy consumption information is obtained during a calibration process. For example, said calibration process is performed at the beginning of the life cycle of the household appliance. In addition, the calibration process may be performed regularly or irregularly during the life cycle of the household appliance in order to adapt the reference energy consumption information during the life cycle of the household appliance.

According to embodiments, the energy consumption of the household appliance, which is loaded with items to be treated, is measured by an energy measuring device included in the household appliance. For example, the household appliance comprises a power board adapted to be coupled with the power grid via a power cable. Said power board may include an energy measuring device adapted to determine the time-dependent energy consumption of the household appliance, which is loaded with items to be treated.

According to embodiments, the energy consumption of the household appliance, which is loaded with items, is measured by an external energy measuring device, said external energy measuring device being coupled with the power connector or power cable of the household appliance.

According to embodiments, said external energy measuring device is coupled with the household appliance via a wired or wireless data transmission path. The wired data transmission path can be a data cable which is provided between the external energy measuring device and the household appliance. Alternatively, the external energy measuring device can be coupled with any control entity, for example a mobile device such as smartphone or tablet computer which is adapted to control the household appliance. More specifically, said control entity may receive information from said external energy measuring device (based on a wired or wireless communication link) and control the household appliance based on said received information. It is worth mentioning that said control entity may be preferably located outside the chassis of the household appliance. According to other embodiments, the wired data transmission path can be formed by the power cable itself. The wireless data transmission path can use any wireless data transmission technology, specifically Wi-Fi, Bluetooth, ZigBee, NFC, Wibree, BLE or BluetoothLowEnergy, WiMAX or infrared optical data transmission.

According to embodiments, said step of controlling the household appliance comprises setting the operating time, particularly the cooking or baking in the case of a food preparation entity, time based on said comparison result. The comparison result may be indicative for the amount of energy needed for heat-up of items by the household appliance. Said amount of heat-up energy depends on the size, weight of the treated items and therefore can be used for determining the operating time, particularly the cooking or baking time.

According to embodiments, the household appliance is controlled by considering additional information, specifically information regarding the category and/or weight of items to be treated, particularly the category of food to be cooked or baked, the food weight etc. Said additional information may be provided by the user via a user interface input.

According to embodiments, said additional information is provided to the household appliance by an external device via a wired or wireless data transmission path. For example, information regarding the weight of said items is provided by an external scale. Based on said information it is possible to refine the control process.

According to yet another aspect of the present invention, a power control system for controlling the supply of an electric appliance, in particular of an electric household appliance, with electrical power, is provided. The electric appliance is coupled to an electric supply system, particularly to a line section of an electric supply system. The electric supply system, particularly the line section of the electric supply system, has a, preferably fuse-protected, limited electrical power transfer capacity. The electric appliance is operated by an operating program, which comprises at least one program segment during which relevant electrical power consumption is drawn from the electric supply system, particularly from the line section of the electric supply system. The operating program, in particular the at least one program segment with relevant electrical power consumption, is controllable based on at least one of:

- the electrical power currently providable by the electric supply system, particularly by the line section of the electric supply system;
- the electrical power allocatable to the electric appliance by the electric supply system, particularly by the line section of the electric supply system, at present or on short notice;
- the voltage value or amperage value currently existent in the electric supply system, particularly in the line section of the electric supply system, during the operation of the electric appliance, in particular during the at least one program segment with relevant electrical power consumption;
- a voltage drop or voltage difference or an amperage change currently occurring in the electric supply system, particularly in the line section of the electric supply system, at the moment of starting an operating program, particularly a program segment, with relevant electrical power consumption;
- a result of a comparison of a measured energy consumption information with a reference energy consumption information.

The at least one program segment with relevant electrical power consumption may comprise a program step with operation of a heating element.

A specific embodiment comprises at least one measuring device, which is adapted to measure at least one physical, particularly at least one electrical, property or value. Said physical property or value may be at least one of:

- electrical current flow;
- voltage value;
- electrical power transfer;
- electrical energy consumption.

The at least one measuring device is adapted to measure at least one physical property or value of the electric appliance or of the electric supply system, particularly of the line section of the electric supply system.

According to embodiments, the measuring device comprises at least one of:

a connected or connectable plug or plug socket device, particularly a smart plug, coupled to or connected with the electric appliance or coupled to or connected with the line section of the electric supply system or coupled to or connected with one phase of the electric supply system, and/or a connected or connectable energy meter, particularly an electric energy meter, more particularly a smart meter, coupled to or connected with the electric appliance or coupled to or connected with at least one phase, preferably with all phases, of the electric supply system.

The term "smart plug" as used herein, preferably refers to a remote switch, preferably comprising and/or coupled to a device capable of power consumption measurement. More preferably, the "smart plug" as used herein is suitable for being plugged-in into an electrical outlet, particularly an electrical outlet as commonly being standard in households.

The measuring device and the electric appliance, particularly the electric household appliance, may be connected to a common network, in particular thereby establishing a virtual smart grid system. Thereby, it is preferred that a virtual smart grid system according to the present invention, preferably is a "local or localized" virtual smart grid system. Both the electric appliance and the measuring device, in particular the smart plug or the smart meter, comprises an information transfer system, preferably a WI-FI module.

Preferably, at least a first electric appliance and a second electric appliance, particularly a first and a second electric household appliance, are connected to a common network, particularly to a virtual smart grid system. According to such embodiment, at least one of the first and the second electric appliances is adapted to provide information to the common network, in particular to the other one of the first and the second electric appliances. Said information is in particular at least one of:

a status information;

the currently activated or running program sequence of the running operating program, particularly the operation of a consumer load with high power consumption value;

connection of the electric appliance to a specific line section of the electric supply system;

each individual maximum power consumption value required by the available operating programs.

The power control system may further comprise an interpretation means for combining and interpreting the information of the electric appliance, in particular of the electric appliance and of the measuring device and/or of the at least first and second electric appliances.

According to embodiment, the power control system further comprises an identification means identifying the line section of the electric supply system the electric appliance being connected to. The identification means is preferably adapted to interpret information which is based on a voltage drop or voltage difference and/or an amperage change observed or measured in the electric supply system at the moment of starting an operating program, particularly a program segment, with relevant electrical power consumption.

According to yet another further aspect of the present invention, a household appliance, particularly a food preparation entity, is provided. The supply of said household appliance may be controlled by the afore-described power control system. Said household appliance, or food preparation entity, respectively, may be a hob or oven. The household appliance is adapted to treat items, in particular to bake and/or cook food, and comprises:

a storage entity for storing information indicating the energy consumption during a heat-up phase of the household appliance which is operated without items to be treated, particularly the energy consumption during a heat-up phase of the non-food-loaded food preparation entity, said information being reference energy consumption information;

energy measuring means for measuring the energy consumption of the household appliance which is operated with items to be treated, particularly the energy consumption of the food-loaded food preparation entity, while a heat-up phase or a data interface for receiving information regarding the energy consumption of the household appliance which is operated with items to be treated, particularly the energy consumption of the food-loaded food preparation entity (1), during a heat-up phase;

a comparison entity adapted to compare the reference energy consumption information and the measured energy consumption, thereby obtaining a comparison result;

a control entity adapted to control the household appliance, particularly the food preparation entity (1), based on said comparison result.

According to embodiments, said energy measuring means are included in the household appliance. Thereby, the reference energy consumption information can be derived by the household appliance itself.

According to embodiments, said energy measuring means comprise an external energy measuring device and the household appliance, particularly the food preparation entity, comprises an interface for receiving information from said external energy measuring device.

According to embodiments, said household appliance, particularly the food preparation entity, comprises an interface for receiving said information from the external energy measuring device via a wired or wireless data transmission path.

According to embodiments, the control entity is adapted to determine the operating time, particularly the cooking or baking time, based on the comparison result.

According to embodiments, said household appliance, particularly the food preparation entity, comprises an interface for receiving further information regarding the items to be treated, particularly the food to be cooked or baked, and wherein the control entity is adapted to control the household appliance, particularly the food preparation entity, based on said further information. Said further information may be information regarding the category and/or weight of items to be treated, particularly food to be cooked or baked, the food weight etc. Said interface may be a user interface adapted to receive user input, specifically manual user input or a wired or wireless interface for receiving said further information from external devices, e.g. a scale etc.

According to embodiments, the household appliance, particularly the food preparation entity, comprises a control entity which is software-driven. Said control entity may provide modular and/or upgradable functions which can be activated/deactivated. Thereby, the household appliance can be updated/upgraded depending on the external devices available in the present user environment without changing the hardware of the household appliance.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
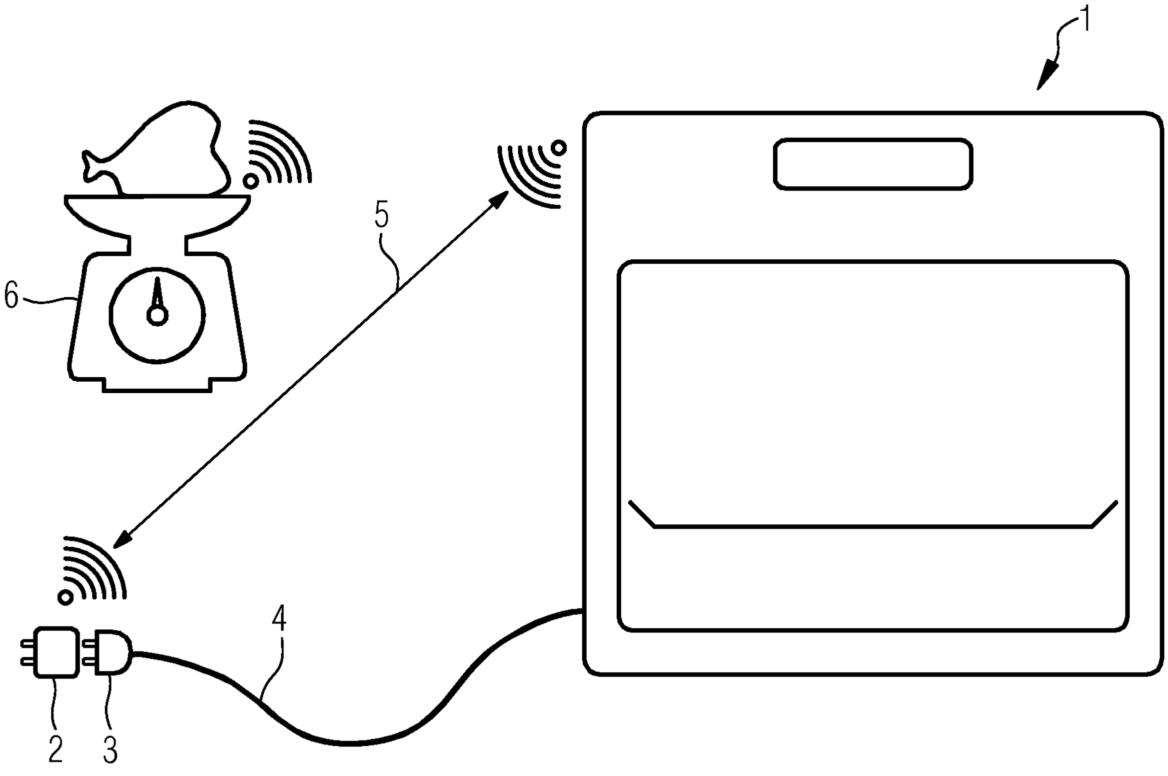
FIG. 1 shows a schematic diagram of an environment in which a food preparation entity is operated.

A first specific embodiment and a second specific embodiment of the present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 illustrates a schematic diagram including a food preparation entity 1. The shown food preparation entity 1 may be a baking oven. The food preparation entity 1 may be electrically powered. According to other embodiments, the food preparation entity 1 may be a gas-powered device, for example a gas oven.

In order to control the food preparation process, the food preparation entity 1 is adapted to store information regarding the energy consumption of the food preparation entity 1 during a heat-up process in which no food is received within the food preparation entity 1 or otherwise in contact with the food preparation entity 1 in order to be cooked or baked (non-food-loaded situation). In the present document, the stored information is also referred to as reference energy consumption information. Said reference energy consumption information may be determined in a calibration process performed after the manufacturing process, after installing the food preparation entity 1 or performed regularly or irregularly during the lifetime of the food preparation entity 1.

Cooking parameters, specifically the cooking time strongly depends on parameters of the food to be cooked or baked. It is well known, that the energy for heating up a food preparation entity 1 strongly depends on the food, for example, received in a cavity of said food preparation entity 1. For example, more energy may be necessary for heating up a food preparation entity 1 which comprises a large-sized piece of food to be cooked or baked. Therefore, information for controlling the food preparation process can be derived by considering the energy consumed during a heat-up process of a food preparation entity 1 which already comprises or includes the food to be prepared (in the following referred to as food-loaded food preparation entity).

In the following, measured energy consumption may refer to an amount of energy which has to be provided to the food preparation entity 1 in order to increase the temperature in the cavity from a first temperature value to a second temperature value. For example, measured energy consumption may refer to an amount of energy which is required for increasing the temperature in a baking oven cavity from a first temperature value (e.g. 80° C.) to a second temperature value (e.g. 100° C.)

The energy consumed during a heat-up process of a food preparation entity 1 can be determined in different ways. According to a first embodiment, an external energy measuring device 2 may be provided which is adapted to gather information regarding the energy consumption, specifically the electrical energy consumption of the food preparation entity 1. The external energy measuring device 2 may be included in the power cable 4 of the food preparation entity 1. Specifically, electrical energy transported through the power cable 4 may flow through the external energy measuring device 2. For example, the external energy measuring device 2 may be an energy sensor plug being included between a socket and a power connector 3 of the food preparation entity 1. Furthermore it's sufficient to know the voltage of the same power phase as the oven uses and the resistance of the used heating elements (e.g. from end of line testing in the factory) to calculate the required energy amount. So the energy sensor plug does not have to be connected directly between the oven and the wall plug. A check if the energy sensor plug is connected to the same power line could also be performed by watching for a voltage drop when the heating elements are switched on the first time.

Alternatively, the external energy measuring device 2 may be provided around the power cable 4 of the food preparation entity 1 in order to determine the energy consumption of the food preparation entity 1 based on inductive and/or capacitive means.

For example, an inductive current clamp may be used to measure the current. Based on the measured electric current value and the resistance of the heating elements, the energy consumption of the food preparation entity 1 can be calculated.

In case of a gas-powered food preparation entity 1, the energy consumption of the entity can be derived by the gas volume that is needed to heat up the entity to a predefined temperature. For example, a gas volume sensor may be used for determining a gas consumption value of the food preparation entity 1 and for calculating the energy consumption during a heat-up phase based on said gas consumption value.

As mentioned before, said external energy measuring device 2 may be adapted to determine the energy consumption of the food preparation entity 1. In order to provide information regarding the power consumption to the food preparation entity 1, the external energy measuring device 2 may comprise an interface for transmitting said information to the food preparation entity 1 via a data transmission path 5.

According to a first embodiment, said interface for transmitting energy consumption information may be a wireless interface. For example, said interface may be a WI-FI or BLUETOOTH interface. Also other wireless transmission standards may be possible. The food preparation entity 1 may comprise a corresponding interface for receiving said energy consumption information.

According to other embodiments, the external energy measuring device 2 comprises an interface for transmitting said energy consumption information via a wired data transmission path 5. Said wired data transmission path 5 may be formed by a separate data cable. Alternatively, said data transmission may be provided via the power cable 4, i.e. the wired data transmission path is formed by the power cable 4.

Still alternatively, the energy measuring device may be included in the food preparation entity 1, i.e., for example, the power board of the food preparation entity 1 may comprise means for measuring the energy consumption of the food preparation entity 1 itself.

Either through the data transmission path 5 provided between the food preparation entity 1 and the external energy measuring device 2 or through an internal data transmission path which is included in the food preparation entity 1 (in case of an internal energy measuring device), a comparison entity included in the food preparation entity 1 may receive the measured energy consumption through a heat-up phase of the food-loaded food preparation entity 1. Said comparison entity may be adapted to compare the measured energy consumption with the reference energy consumption information. Based on said comparison step, a comparison result is obtained, said comparison result being indicative for the additional energy needed for heating up because of said food load.

Based on said comparison result, it is possible to control the food preparation process performed by the food preparation entity 1. For example, it is possible to determine or estimate the cooking or baking time based on said comparison result. According to other embodiments, it may be possible to determine a certain cooking or baking procedure (e.g. certain temperature profile etc.).

In addition, specifically parameters like size, weight, initial temperature of food (e.g. frozen, fridge temperature, room temperature etc.) when starting the cooking or baking process have strong influence on the cooking or baking process, specifically on the temperature to be selected and/or the required cooking or baking time.

Therefore, the food preparation entity may comprise an interface for receiving additional information regarding the food to be prepared. According to a first embodiment, said interface may be a user interface, through which the user may provide an input regarding one or more of uppermentioned food parameters.

According to other embodiments, the interface may be adapted to provide a data transmission between one or more external devices 6 and the food preparation entity 1. Said data transmission may be provided through a wired or a wireless data transmission path.

For example, the external device 6 may be a scale which provides information regarding the weight of the food to be prepared to the food preparation entity 1 via a wired or a wireless data transmission path.

Said additional parameters provided by a user input or further external devices 6 may be considered while controlling the food preparation entity 1.

Figure 2:
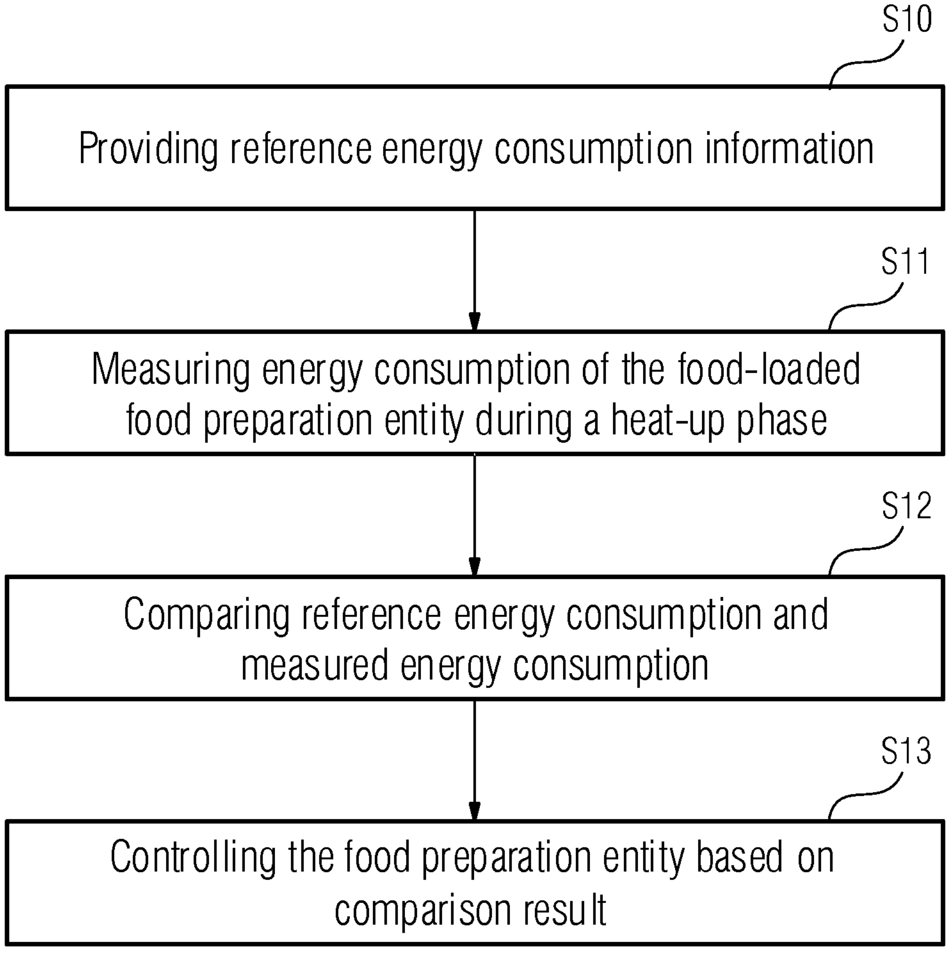
FIG. 2 shows a basic flow chart of a method for operating a food preparation entity.

FIG. 2 shows a flow chart of a method for operating a food preparation entity 1.

In a first step, information regarding a reference energy consumption of the food preparation entity 1 is provided (S10). Said information may be reference information gathered in a calibration process during heating up the non-food-loaded food preparation entity 1.

After said calibration process, the energy consumption of the food-loaded food preparation entity 1 may be measured during the heat-up phase (S11). Because of the food load, the energy consumption may be increased.

In a further step, the reference energy consumption may be compared with the measured energy consumption (S12). Thereby a comparison result is obtained. Specifically, the difference in energy consumption may be determined.

Based on said comparison result, the food preparation entity 1 may be controlled (S13). Specifically, the cooking or baking time may be controlled based on said comparison result.

It should be noted that the description and drawings merely illustrate the principles of the proposed invention. Those skilled in the art will be able to implement various arrangements that, although not explicitly described or shown herein, embody the principles of the invention.

Figure 3:
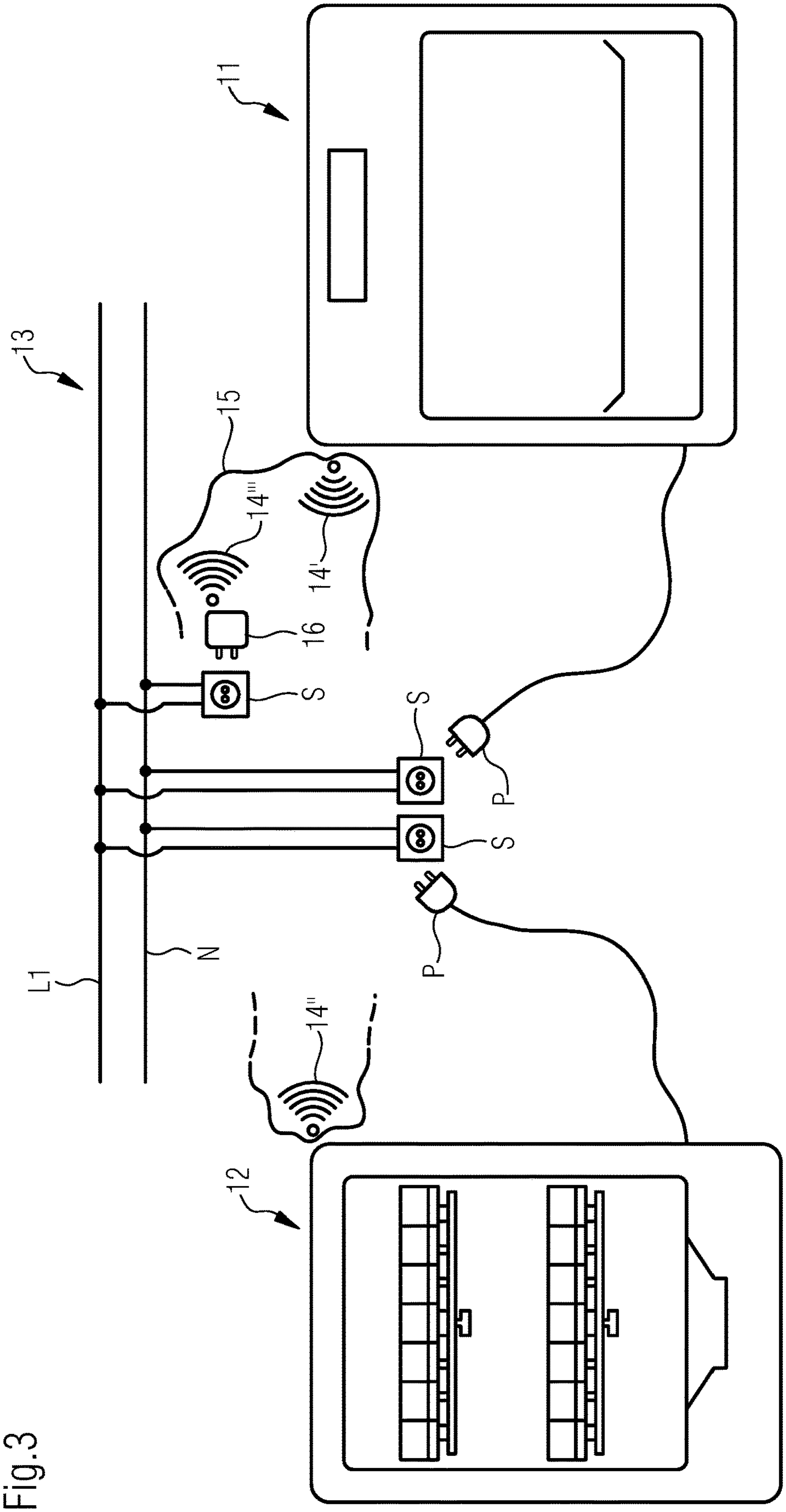
FIG. 3 shows a schematic diagram of an environment in which an oven and a dishwasher are operated.

According to a second specific embodiment of the invention a further example is described more fully, particularly with reference to FIG. 3.

FIG. 3 illustrates a schematic diagram including an oven 11 and a dishwasher 12. These two major household appliances are connected via their respective plugs P and allocated plug sockets S of the domestic installation arrangement to the same line section 13 of the electric supply system. Both the oven 11 and the dishwasher 12 are equipped with heating elements for an intermittent heating of the respective treatment medium during their operations. The oven 11 comprises different heating elements, e. g. heating rods for top and bottom heat and a ring heater for recirculated-air operation. The connection value of the oven 11 is 3.5 kW. The dishwasher 12 comprises a heating element for heating the washing fluid and its connection value is 1.9 kW.

The line section 13 of the electric supply system is limited in its electrical power provision by means of a fuse-protection to a maximum current of 16 A. Therefore, if operating both the oven 11 and the dishwasher 12 in parallel with utilization of their total connection values, a current flow of about 23.5 A would occur with the effect of overloading the line section 13 and triggering of the fuse. Consequently, it has to be avoided to operate the oven 11 and the dishwasher 12 at the same time, at least not both of them simultaneously operating with maximum power draw.

This is managed by establishing a "virtual smart grid system" 15 which is characterized by a common network for both oven 11 and dishwasher 12 and with monitoring, communication and control functions. Both oven 11 and dishwasher 12 comprise WI-FI modules 14', 14" and are connected via their WI-FI modules 14', 14" to the common network and to the virtual smart grid system 15, respectively. In this context, "connected" means that both the oven 11 and the dishwasher 12 are adapted for communicating, i. e. broadcasting, data or information to the virtual smart grid system 15 and for receiving data or information from the virtual smart grid system 15.

In addition, a smart plug 16 is connected to the same line section 13 of the electric supply system. The smart plug 16 also comprises a WI-FI module 14''' and is adapted for communicating, i. e. broadcasting, information to the virtual smart grid system 15.

Recipient of the information communicated by the oven 11, the dishwasher 12 and the smart plug 16 may be a central monitoring and control system. The present example, however, is characterized by a decentralized or local monitoring and controlling of the units within the virtual smart grid system 15. To this end, the individual control units of the oven 11 and the dishwasher 12 comprise program modules adapted for processing the information received from the virtual smart grid system 15 with the effect of modifying running operating programs of the dedicated household appliance 11, 12 and/or executing specific subroutines after receipt of respective information.

The operation method of the virtual smart grid system 15 for a control of impending line section overload is as follows. A first step is the identification of entities which are coupled to the same line section 13. In fact, during the single operations of the oven 11 and the dishwasher 12 the virtual smart grid system 15, particularly each control unit of the involved household appliances 11, 12, analyses that the oven 11 and the dishwasher 12 are connected to the same line section 13 of the electric supply system, based on a voltage drop observed by the smart plug 16 and the broadcasted heating cycle information of the oven and the dishwasher. With other words, during the operation of e. g. the oven 11, a heating element thereof is switched on for heating up the oven compartment. Simultaneously, the oven 11 communicates to the virtual smart grid system 15 this incidence of the start of a heating phase. Due to the sudden increase of electrical power drawn from the line section 13 by the oven 11 at the moment of switch-on, a voltage drop occurs in the line section, the magnitude thereof depending on the robustness of the electric supply system. Nevertheless, the smart plug 16 is characterized by a relevant sensitivity and, hence, is able to detect the voltage drop. Immediately this incident of voltage drop recognition is communicated by the smart plug 16 to the virtual smart grid system 15 as well. With both said types of information, the virtual smart grid system 15 identifies that smart plug 16 and oven 11 are connected to the same line section 13.

The same identification routine applies to the dishwasher 12 with the effect of identification of also the dishwasher 12 and the smart plug 16, consequently all entities 11, 12 and 16, being connected to the same line section 15.

In addition, the oven 11 and the dishwasher 12 broadcast the maximum electrical power they are requesting from the line section 15 during the course of their individual operating programs comprising a heating cycle. The different operating programs may differ in said maximum power drop.

The virtual smart grid system 15 is set to prevent a maximum power usage on the shared line section 13 exceeding 16 A in the 230 V line section 15. So, when the oven 11 is switched on to heat up in an operating program using a hot air mode, characterized by 10 A/230 V, the virtual smart grid system 15 indicates the dishwasher 12 that only 6 A are left on the line section 15 in order to avoid overloading of the line section 15. That way, the dishwasher 12 recognizes that only operating programs with maximum 6 A can be run. As a consequence, the dishwasher 12 only offers cleaning programs with a maximum power usage of 1380 W to the user.

The control functionalities of the virtual smart grid system 15 may comprise options like: making boost functions available, pausing non time critical processes, switching to a low power cycle, restricting the options of the user to low power cycles, start the normal cycle when no other appliances are running, etc.

The afore-described virtual smart grid system 15 may work with a multitude of household appliances like ovens, cooktops, fridges, freezers, dishwashers, washing machines, dryers, air condition ers, hoods, etc.

LIST OF REFERENCE NUMERALS

1 food preparation entity
2 external energy measuring device
3 power connector
4 power cable
5 data transmission path
6 external device
11 oven
12 dishwasher
13 line section of electric supply system
14',14'',14''' WI-FI modules
15 virtual smart grid system
16 smart plug
P plug
S socket
L1 phase conductor
N neutral conductor

The invention claimed is:

1. A method for controlling an electric household appliance, the electric appliance:

being coupled to a line section of an electric supply system having a fuse-protected, limited electrical power transfer capacity, and being operated by an operating program, which comprises at least one program segment during which relevant electrical power consumption is drawn from the line section of the electric supply system, wherein the at least one program segment with relevant electrical power consumption is controlled based on at least one of:

electrical power currently providable by the line section of the electric supply system;

electrical power allocatable to the electric appliance by the line section of the electric supply system, at present or on short notice;

a voltage value or amperage value currently existent in the line section of the electric supply system during operation of the electric appliance during the at least one program segment with relevant electrical power consumption;

a voltage drop or voltage difference or an amperage change currently occurring in the line section of the electric supply system at a moment of starting the at least one program segment with relevant electrical power consumption;

a result of a comparison of a measured energy consumption information with a reference energy consumption information, wherein, at least one electrical property or value is measured by means of at least one measuring device, and wherein the at least one program segment with relevant electrical power consumption comprises a program step with operation of a heating element, wherein the electric supply system communicates a value of fuse protection of the line section and/or a maximum providable amperage value and/or maximum providable electrical power to the electric appliance or to a network the electric appliance is connected to.

2. The method according to claim 1, wherein the electric supply system further communicates a currently still providable amperage value and/or a maximum providable, and/or currently still providable electrical power to the electric appliance or to the network the electric appliance is connected to.

3. The method according to claim 1, wherein first and second said electric household appliances, are connected to a common network, wherein at least one of the first and the second electric appliances provides information to the common network, and wherein at least one of the first and the second electric appliances communicates at least one of:

a status information;

a currently activated or running program sequence of the running operating program comprising a consumer load with high power consumption value;

connection of the electric appliance to the line section of the electric supply system;

each individual maximum power consumption value required by available operating programs.

4. The method according to claim 3, wherein a control device or system of the first electric appliance or of the second electric appliance or of the common network combines the information provided by the first and the second electrical appliances and of the electric supply system and/or of the at least one measuring device, including status information of the first and second electrical appliances and/or voltage value or voltage drop information in the line section of the electric supply system, for the control of at least one of the first or second electric appliances.

5. The method according to claim 1, wherein the at least one program segment with relevant electrical power consumption of the electric appliance is modified based on the result of voltage, amperage, and/or power measurement, the modification of the operating program comprising at least one of:

pausing or postponing a non-time-critical process or program step;

making boost functions available during periods of a current low power required from from the line section of the electric supply system;

switching to a low power operating program cycle;

reducing energy transfer rate during a heating cycle, to be compensated by an increased program duration.

6. The method according to claim 5, wherein the at least one program segment with relevant electrical power consumption is modified based on a voltage difference between a measured actual available voltage value and a reference voltage value of the line section of the electric supply system.

7. The method according to claim 1, wherein the electric appliance is controllable based on a result of voltage, amperage, and/or power measurement by means of at least one of:

limiting a maximum power allocated to the electric appliance when starting an operating program;

postponing the start of a requested operating program until no other appliance or only appliances with operating programs with low power consumption is or are running;

offering only operating programs for a selection by a user of the electric appliance, which operating programs match the available electrical power;

restricting options of the user to power-limited program cycles by not offering operating program options with a boost function.

8. The method according to claim 3, wherein a priority level is allocated to at least one of the first and the second electric appliances, to at least one of specific operating programs of the first and the second electric appliances, and/or to at least one of specific program steps of the operating programs of the first and the second electric appliances, such that currently available electrical power is assigned primarily to a higher prioritized electric appliance, operating program, and/or program step.

9. The method according to claim 1, said household appliance being adapted to bake and/or cook food, the method further comprising the steps of:

providing reference energy consumption information, said reference energy consumption information indicating the energy consumption of the household appliance which is operated without items to be treated and thus having no food loaded in the appliance during a heat-up phase;

measuring energy consumption of the household appliance when operated with items to be treated such that food is loaded in the appliance during a heat-up phase;

comparing the reference energy consumption information and the measured energy consumption, thereby obtaining a comparison result;

controlling the household appliance based on said comparison result, said reference energy consumption information being obtained during a calibration process, which calibration process is performed regularly or irregularly during a lifetime of the household appliance.

10. The method according to claim 1, wherein energy consumption of the household appliance when operated with items to be treated is estimated by an external energy measuring device, said external energy measuring device being connected to the same line section of the electric supply system as the household appliance, and based on one or more resistance values of one or more heating elements of the household appliance, said external energy measuring device being coupled with the household appliance via a wired or wireless data transmission path.

11. The method according to claim 1, wherein said step of controlling the household appliance comprises setting an operating time based on said comparison result.

12. The method according to claim 1, wherein the household appliance is controlled by considering additional information regarding a weight of the items to be treated, said additional information being provided to the household appliance by an external device via a wired or wireless data transmission path.

13. A power control system for controlling the supply of an electric household appliance with electrical power, the electric household appliance:

being coupled to a line section of an electric supply system, the line section of the electric supply system having a fuse-protected, limited electrical power transfer capacity, and being operated by an operating program, which comprises at least one program segment during which relevant electrical power consumption is drawn from the line section of the electric supply system, wherein the at least one program segment with relevant electrical power consumption is controllable based on at least one of:

electrical power currently providable by the line section of the electric supply system;

electrical power allocatable to the electric household appliance by the line section of the electric supply system, at present or on short notice;

a voltage value or amperage value currently existent in the line section of the electric supply system during operation of the electric household appliance during the at least one program segment with relevant electrical power consumption;

a voltage drop or voltage difference or an amperage change currently occurring in the line section of the electric supply system at a moment of starting the at least one program segment with relevant electrical power consumption;

a result of a comparison of a measured energy consumption information with a reference energy consumption information, wherein the at least one program segment with relevant electrical power consumption comprises a program step with operation of a heating element, wherein the electric supply system is configured to communicate a value of fuse protection of the line section and/or a maximum providable amperage value and/or a maximum providable electrical power to the electric household appliance or to a network the electric household appliance is connected to.

14. The power control system according to claim 13, comprising at least one measuring device, which is adapted to measure at least one electrical property or value selected from among:

electrical current flow;

voltage value;

electrical power transfer;

electrical energy consumption, the at least one measuring device being adapted to measure at least one physical property or value of the electric household appliance or of the line section of the electric supply system.

15. The power control system according to claim 13, wherein the measuring device comprises at least one of:

a connected or connectable plug or plug socket device coupled to or connected with the electric household appliance or coupled to or connected with the line section of the electric supply system or coupled to or connected with one phase of the electric supply system, or a connected or connectable energy meter coupled to or connected with the electric household appliance or coupled to or connected with at least one phase of the electric supply system.

16. The power control system according to claim 14, wherein the measuring device and the electric household appliance are connected to a common network, thereby establishing a virtual smart grid system, both the electric household appliance and the measuring device comprising an information transfer system comprising a WI-FI module.

17. The power control system according to claim 13, wherein at least a first said electric household appliance and a second said electric household appliance are connected to a common network comprising a virtual smart grid system, wherein at least one of the first and the second electric household appliances is adapted to provide information to the common network, which information comprises at least one of:

a status information;

a currently activated or running program sequence of the running operating program comprising a consumer load with high power consumption value;

connection of the electric appliance to the section of the electric supply system;

each individual maximum power consumption value required by the available operating programs.

18. The power control system according to claim 13, further comprising an identifier identifying the line section of the electric supply system, the identifier being adapted to interpret information which is based on a voltage drop or voltage difference and/or an amperage change observed or measured in the electric supply system at a moment of starting a program segment with relevant electrical power consumption.

19. The power control system according to claim 13, said household appliance being adapted to bake and/or cook food, and comprising:

a storage entity for storing information indicating energy consumption during a heat-up phase of the household appliance which is operated without items to be baked or cooked during a heat-up phase, said information being a reference energy consumption information;

an energy sensor plug for measuring energy consumption of the household appliance which is operated with items to be baked or cooked loaded in the household appliance, while a heat-up phase or a data interface for receiving information regarding energy consumption of the household appliance which is operated with items to be baked or cooked with food loaded therein during a heat-up phase;

a comparison entity adapted to compare the reference energy consumption information and the measured energy consumption, thereby obtaining a comparison result;

a control entity adapted to control the household appliance based on said comparison result.

20. The power control system according to claim 19, wherein said energy sensor plug comprises an external energy measuring device and the household appliance comprises an interface for receiving information from said external energy measuring device, the household appliance comprising an interface for receiving said information from the external energy measuring device via a wired or wireless data transmission path.

* * * * *